April 22, 1952 E. W. HOLMAN 2,594,019
CURRENT SUPPLY APPARATUS
Filed June 17, 1950 3 Sheets-Sheet 1

INVENTOR
E. W. HOLMAN
BY
G. F. Heuerman
ATTORNEY

April 22, 1952  E. W. HOLMAN  2,594,019
CURRENT SUPPLY APPARATUS
Filed June 17, 1950  3 Sheets-Sheet 2
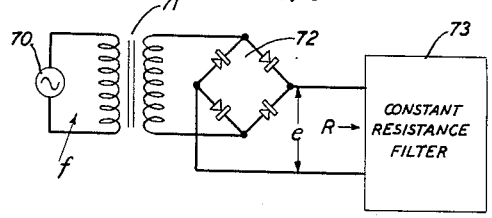
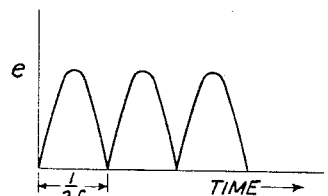
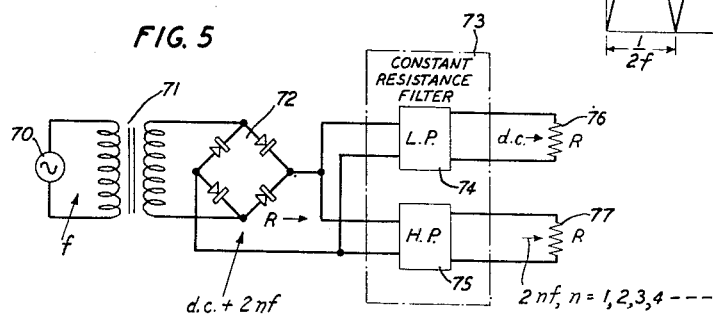
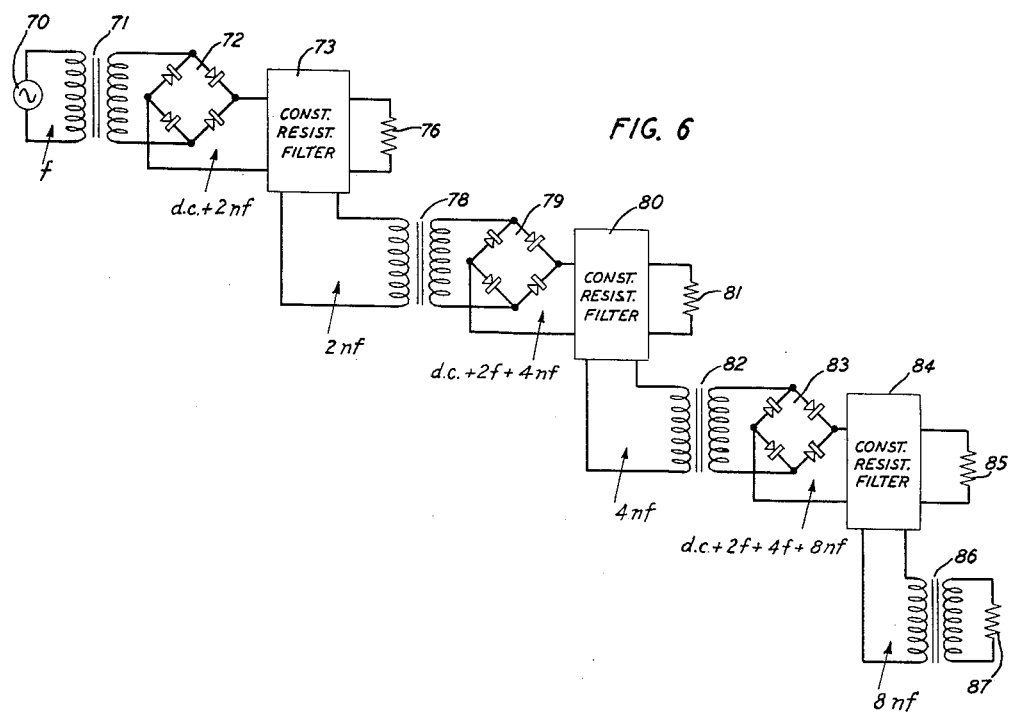
INVENTOR
E. W. HOLMAN
BY
ATTORNEY April 22, 1952     E. W. HOLMAN     2,594,019
CURRENT SUPPLY APPARATUS
Filed June 17, 1950     3 Sheets-Sheet 3
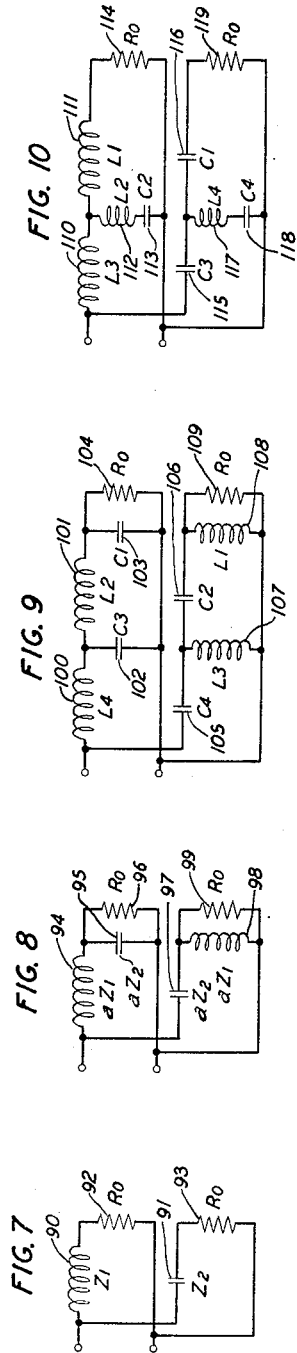
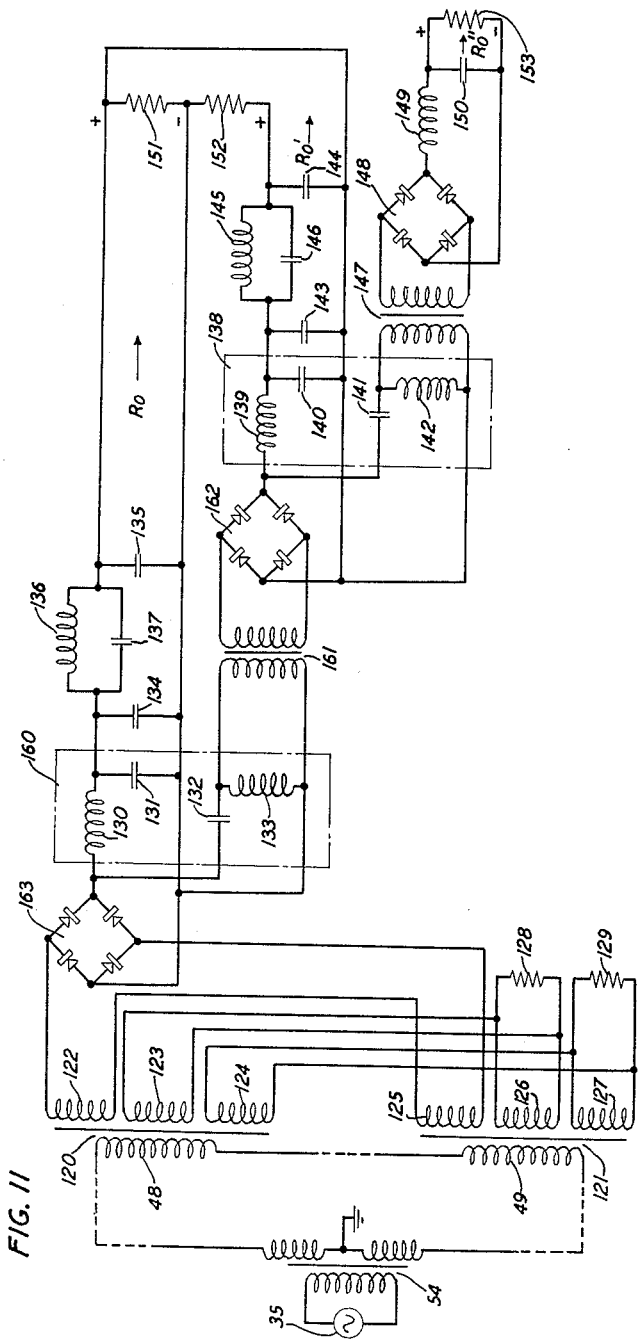
INVENTOR
E. W. HOLMAN
BY
G. F. Heuerman
ATTORNEY Patented Apr. 22, 1952

2,594,019

UNITED STATES PATENT OFFICE 2,594,019

CURRENT SUPPLY APPARATUS

Erwin W. Holman, Summit, N. J., assignor to Bell Telephone Laboratories, Incorporated, New York, N. Y., a corporation of New York Application June 17, 1950, Serial No. 168,828

15 Claims. (Cl. 171—97)

This invention relates to current supply systems and apparatus, and particularly to a current supply system and apparatus for supplying suitable operating currents to space current amplifiers or repeaters associated with a carrier current signal transmission system.

In conventional rectifying apparatus, the output current of the rectifier is supplied to a low-pass filter for suppressing alternating components of the rectified current and transmitting the relatively steady direct component to a load. When the type of filter used is such that the filter presents to the rectifier a series inductance followed by shunt capacitance, for example, the impedance looking into the rectifier and consequently into the power transformer of the rectifier has a positive reactive component. The non-linear flow of current into the condensers of the filter as they become charged results in harmonic distortion of the current supplied from the alternating-current supply line to the transformer. The poor power factor and the harmonic distortion resulting from such an arrangement are often objectionable. Power companies sometimes charge an increased rate for loads having a poor power factor. Moreover, the harmonic distortion of the power current results in power loss and in interfering currents of audible frequencies being introduced into nearby communication circuits.

The low power factor of the rectifying apparatus and harmonic distortion of the line current have been found to be particularly undesirable in the case of power packs including rectifiers used for energizing spaced vacuum tube repeaters of a carrier current, coaxial conductor communication system in which the low frequency alternating current supplied to the rectifiers is transmitted from a constant current supply source over the inner conductors of a pair of coaxial conductor transmission lines. In such a system it is necessary to maintain substantially constant the amplitude of the alternating current supplied to the power packs since an amplitude variation of more than a few per cent will have an adverse effect upon the gain of the amplifiers at the repeater points. To maintain such close control of the current transmitted over the inner conductors of the cables, it is necessary to load the transmission circuit for the low frequency current by accurate amounts. This is best accomplished by series loading, that is, by introducing inductive reactance in series with the cable to compensate for the capacitive reactance of the cable, the amount of loading required increasing substantially parabolically with increase of the distance from the point at which the alternating current is looped from one coaxial cable conductor to the other.

A conventional rectifier or power pack having a ripple filter of the choke input type contributes series loading to the system of an amount which may be different for different rectifiers, respectively, and which in some cases may exceed the loading required. It is therefore, desirable to reduce the reactive component of the impedance presented by the power pack to the alternating-current transmission line to such an extent that it has no appreciable effect upon the current.

The coaxial cable has appreciable resistance to the power frequency, 60 cycles per second, for example. In order to transmit the alternating current to power packs for energizing a maximum number of repeaters spaced along the cable for a given supply voltage, each power pack should have an equivalent resistance substantially equal to the resistance of the cable section between successive repeaters and in some cases it is desirable to have the resistance of the power pack greater than the resistance of a cable section. Therefore, if the line current supplied to the power packs has an appreciable amount of harmonic distortion, the voltage drop along the cable will likewise be distorted and this results in a distorted voltage wave being supplied to each power pack, the amount of the distortion increasing as the length of the transmission line between the source and a power pack is increased. The filament heating of each repeater amplifier is dependent on the root-mean-square value of the alternating voltage impressed upon the power pack for the repeater while the direct voltage for energizing the amplifier obtained from the rectifier of the power pack is dependent substantially on the peak value of the alternating voltage wave. Thus the alternating voltage wave shape, and therefore the relationship between the root-mean-square filament voltage and the direct voltage for supplying space current for the amplifiers, will vary for different repeaters, respectively, unless some compensation is provided. The elimination of the voltage wave distortion will make the need for such compensation unnecessary.

It is therefore an object of the invention to provide rectified current supply apparatus having a high power factor or, in other words, such apparatus in which the reactive component of the input impedance of the rectifier is minimized.

Another object is to minimize the harmonic distortion of the alternating current supplied to the apparatus for supplying rectified current to a load.

In accordance with the invention, the reactive component of the input impedance of a rectifier and the input alternating-current distortion are reduced by terminating the rectifier output in a constant resistance filter comprising a low-pass filter portion and a high-pass filter portion connected in parallel to the rectifier output terminals. Direct current is supplied through the low-pass filter portion to a direct-current load. The alternating components of the rectified current are also preferably supplied to a useful load. For example, these alternating components may be supplied to the input of a second rectifier the output of which is terminated in a second constant resistance filter comprising a low-pass portion and a high-pass portion connected in parallel to the output terminals of the second rectifier. The output current of the second low-pass filter portion is again supplied to a direct-current load and the output current of the second high-pass filter portion is supplied to a useful load which, if desired, may comprise a third rectifier. The direct current obtained from the current supply apparatus or power pack may be supplied, for example, to the space current paths of space current devices. In such a case, if desired, the input transformer through which alternating current is supplied to the power pack may be provided with one or more secondary windings for supplying alternating current to filamentary cathodes or to cathode heaters of the space current devices. A reactive impedance component may also be introduced by the input transformer of the power pack. However, this factor can be minimized by using a transformer having a low leakage reactance. With current supply apparatus of the type described, the power factor and the efficiency of the apparatus may be maintained at high values. A typical experimental apparatus which was tested was found to have a power input of 131.8 watts at a power factor of 0.99 and a useful output power of 83.6 watts, giving an efficiency of 63.5 per cent, the power output comprising 53.0 watts of direct-current power and 30.6 watts of alternating-current power.

The invention will be further described with reference to the accompanying drawing in which:

Fig. 3 is a schematic view of a full-wave rectifier terminated in a constant resistance filter in accordance with the invention;

Fig. 4 is a diagram showing the voltage impressed upon the constant resistance filter of Fig. 3;

Fig. 5 is a schematic view of the rectifier of Fig. 3 showing the low-pass and high-pass portions of the constant resistance filter;

Fig. 6 is a schematic view of a filter system in accordance with the invention having a plurality of rectifiers each terminated in a constant resistance filter;

Figs. 7, 8, 9 and 10 are schematic views showing typical constant resistance filters which may be used to terminate rectifiers in accordance with the invention; and Fig. 11 is a schematic view of a power pack embodying the invention.

Figure 1:
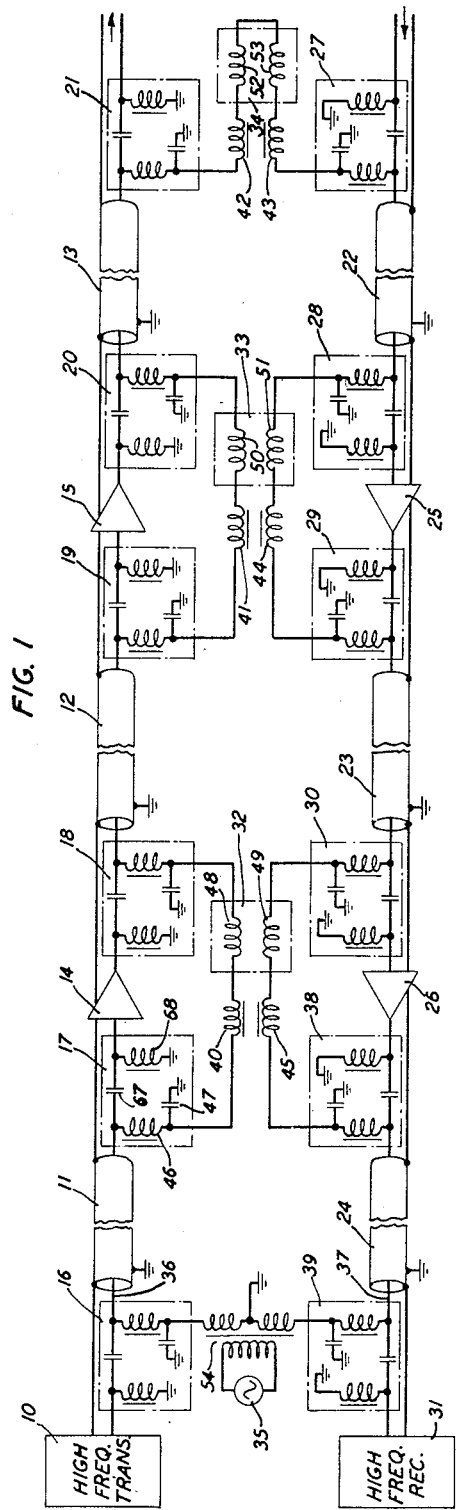
Fig. 1 is a schematic view of a coaxial conductor communication system employing power packs in accordance with the invention at spaced repeater points.

Referring to the drawing, there is shown in Fig. 1 a portion of a carrier current communication system in which signal modulated high frequency carrier currents from a transmitting apparatus 10 are transmitted in one direction over sections 11, 12 and 13 of a coaxial conductor cable through vacuum tube repeaters 14 and 15 located between adjacent cable sections and filters 16, 17, 18, 19, 20 and 21, the outer conductors of the cable being grounded.

Modulated carrier current signals are similarly transmitted in the opposite direction over sections 22, 23 and 24 of a second coaxial cable through repeaters 25 and 26 and filters 27, 28, 29, 30, 38 and 39 to receiving apparatus 31, the outer cable conductors being grounded. Power packs 32, 33 and 34 are provided at repeater points, respectively, for supplying suitable energy for repeaters such as 14, 15, 25 and 26. The power packs 32, 33 and 34 are energized by current from an alternating-current source 35, having a frequency of 60 cycles per second, for example, transmitted over the inner conductors 36 and 37 of the cables, respectively, through a series circuit comprising power separating filters 17, 18, 19, 20, 21, 27, 28, 29, 30, 38 and 39 and loading coils 40, 41, 42, 43, 44 and 45, input transformer windings 48 and 49 of power pack 32, input transformer windings 50 and 51 of power pack 33, and input transformer windings 52 and 53 of power pack 34. The alternating-current source 35 is connected to the primary of a transformer 54 the secondary of which is connected to the inner cable conductors 36 and 37, a mid-tap of the secondary winding being grounded. The voltage impressed upon cable conductors 36 and 37 from the secondary of transformer 54 may be of the order of 4000 volts, for example. The filters 16, 17, 18, 19, 20, 21, 27, 28, 29, 30, 38 and 39 are provided for separating the signal modulated carrier currents from source 10 from the alternating current of 60 cycles per second, for example, from the power line source 35 at each repeater. Each of these filters, the filter 17 for example, comprises a low-pass filter made up of a series inductance element 46 and a shunt condenser 47 and a high-pass filter made up of a series condenser 67 and a shunt inductance 68. The low-pass and high-pass filters have their inputs in parallel and separate outputs. The low-pass branch offers a high impedance to the modulated carrier current frequencies and a low impedance to the power current frequency while the high-pass branch offers a low impedance to the modulated carrier frequencies and a high impedance to the power current frequency, thus effectively separating the carrier frequency currents from the power frequency currents.

Figure 2:
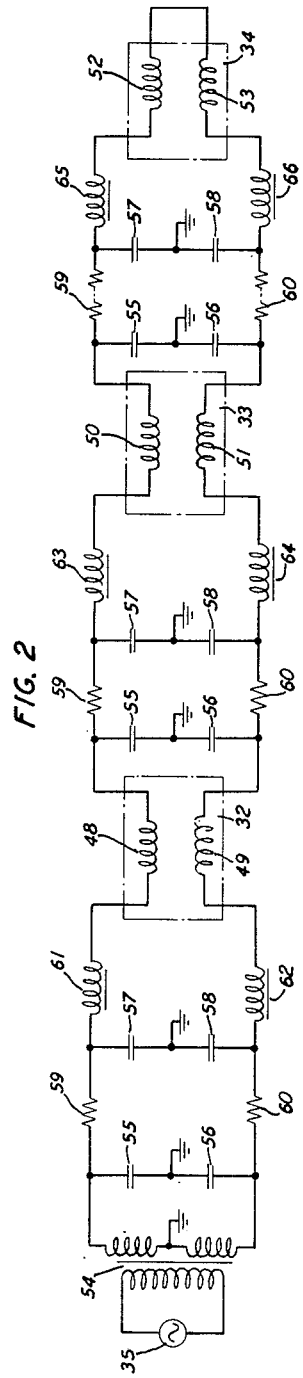
Fig. 2 is a schematic view of the transmission line for transmitting alternating current to the power packs in a system in accordance with Fig. 1.

Fig. 2 shows schematically the transmission line for transmitting alternating current from source 35 through transformer 54 to the power packs 32, 33 and 34. Each section of the coaxial cable has capacitance between the inner conductors and the outer grounded conductors. This capacitance together with the capacitance of the power and carrier separation filters is represented by condensers 55 and 56 in series in one shunt path and condensers 57 and 58 in series in a second shunt path, the common terminal of condensers 55 and 56 and the common terminal of condensers 57 and 58 being grounded. The series resistance of each cable section is represented by resistors 59 and 60. The cable resistances 59 and 60 of a section of the cable may each be about 21.7 ohms, for example. For transmission of power to a maximum number of power packs for a given input voltage, the resistance looking into the primary winding 48 and the resistance looking into the primary winding 49, for example, should each be 21.7 ohms. However, in an experimental system which has been set up the resistances looking into the primary windings of each power pack were made 32.6 ohms each. The capacitances 55, 56, 57 and 58 were each 0.2126 microfarad. In order to maintain the root-mean-square amplitude of the 60-cycle current supplied to the input transformer windings of all the power packs substantially constant, it is necessary to load each cable section to compensate for the cable capacitance. This loading is represented by inductance coils 61, 62, 63, 64, 65 and 66. The inductance required in each cable section is less than that required in a preceding section nearer the source 35. For example, in a power system of twenty-two cable sections, the inductance of each of coils 61 and 62 may be 0.6 henry and the inductance of the coils used in succeeding sections may decrease parabolically, the loading decreasing to zero for the twenty-second cable section. As previously pointed out, in order to have the correct loading for each section, it is desirable to have the impedance looking into the transformer of each power pack substantially a pure resistance. If the impedances looking into the power packs were inductive and because of this the loading of each section were excessive, the line current would not be constant and the power delivered to different rectifiers, respectively, would not be the same and consequently the rectified voltages would not be the same. In addition if the power frequency current to the rectifier had harmonic distortion, this distorted current through the cable resistances 59 and 60 would result in a distorted voltage wave with a consequent variation in the rectifier output voltage from repeater to repeater, the amount of distortion increasing with the distance along the cable from the power source 35.

By terminating the rectifier or rectifiers used in the power packs, such as 32, 33 and 34, in a constant resistance filter, the input impedance of each power pack is given a high power factor and harmonic distortion of the power frequency current supplied to the power packs is reduced. As shown in Fig. 3, current from a source of alternating current 70 having a frequency $f$ is supplied to the primary winding of a rectifier input transformer 71 having a low leakage reactance. The secondary transformer winding is connected to the input terminals of a bridge-type full-wave rectifier 72 having a selenium or other rectifying element, or a plurality of such elements, in each of the bridge arms. The output rectifier terminals are connected to the input of a constant resistance filter 73, the impedance looking into the filter being a substantially constant resistance R at all frequencies. The impedance looking into the primary of transformer 71 will also have a negligibly small reactive component. The voltage $e$ supplied from the rectifier output to the input of the filter 73 is a pulsating voltage the pulses of which recur at a frequency equal to $2f$, as shown in Fig. 4. It is the purpose of the filter 73 to separate the steady direct component of the voltage $e$ from the alternating components thereof. The theory and design of a constant resistance filter is disclosed in an article by E. L. Norton entitled "Constant Resistance Networks with Applications to Filter Groups," published in Bell System Technical Journal, volume XVI, pages 178 to 193, April 1933.

As shown in Fig. 5, the constant resistance filter 73 comprises a low-pass filter portion 74 and a high-pass filter portion 75. The output current of the rectifier has a steady direct component and alternating components having frequencies of $2nf$ where $n$ is equal to 1, 2, 3, 4, etc. The direct or zero frequency component is transmitted through filter portion 74 to a resistive load 76 and the alternating components are transmitted through filter portion 75 to a resistive load 77, the resistance of which is equal to the resistance of load 76. The primary consideration in designing a constant resistance filter is the resistance of the load 76 to which direct current is supplied, this resistance being equal to the load voltage divided by the load current. The magnitude of the load resistance 76 determines the impedance level of the low-pass filter portion. The type and complexity of the low-pass filter portion are determined by the attenuation required to suppress or to reduce the ripple components of the rectifier output to a desired level at the load. The design of the high-pass filter portion will be determined from that of the low-pass filter portion. The root-mean-square value of the alternating component voltage at the input of the constant resistance filter for a full-wave rectifier is about 0.48 times the direct component, the major portion of the alternating component voltage being the second harmonic of the supply voltage, that is, 120 cycles per second where the supply voltage is 60 cycles per second. The efficiency of the system will thus be increased considerably when the alternating components transmitted by the high-pass filter portion are supplied to a useful load 77 which may be filamentary cathodes or cathode heaters of vacuum tubes, for example.

In some cases it is desirable to supply the alternating component of the constant resistance filter 73 through a second input transformer 78 to a second rectifier 79, as shown in Fig. 6. The output of the second full-wave rectifier 79 will have a steady direct component and alternating components having frequencies of $2f$ and $4nf$, where $n$ equals 1, 2, 3, 4, etc. This output of the rectifier 79 may be supplied to a second constant resistance filter 80. The direct component passed by the low-pass filter portion of filter 80 is supplied to a load 81. If desired, the alternating components passed by the high-pass filter portion of filter 80 are supplied through a third transformer 82 to a third rectifier 83 which is terminated in a constant resistance filter 84. The output of rectifier 83 will have a steady direct component and alternating components of frequencies $2f$, $4f$ and $8nf$. The direct-current output of filter 84 may be supplied to a load 85 and the alternating components may be supplied through a transformer 86 to a load 87.

Several typical constant resistance filters which may be used as described above are shown in Figs. 7, 8, 9 and 10. These filters are designed so that a certain frequency $f_0$, called the crossover frequency, the low-pass filter portion and the high-pass filter portion each has an attenuation or transmission loss of 3.0 decibels. In Fig. 7, the low-pass filter portion comprises an inductance coil 90 having an impedance $Z_1$ through which the direct component of the rectified current flows to a load resistance 92 having a resistance value $R_0$. The high-pass filter portion comprises a condenser 91 having an impedance $Z_2$ through which the alternating ripple components flow to a load resistance 93 having a resistance value of $R_0$. The filter design is such that $Z_1Z_2=R_0^2$; $Z_1=R_0$ at frequency $f_0$ and the loss of the low-pass filter portion at frequency $f$ equals $$10 \log \left[1+\left(\frac{f}{f_0}\right)^2\right]$$

decibels.

The low-pass filter portion of the filter shown in Fig. 8 comprises a series inductance 94 having an impedance $aZ_1$ and a shunt capacitance 95 having an impedance $aZ_2$. A load resistance 96 having a resistance value $R_0$ is connected across condenser 95. The high-pass filter portion comprises a series condenser 97 having an impedance $aZ_2$ and a shunt inductance 98 having an impedance $aZ_1$, a load resistance 99 having a value $R_0$ being connected across the inductance 98. The value of $a$ is $\sqrt{2}$ and $Z_1Z_2=R_0^2$; $Z_1=R_0$ at frequency $f_0$ and the loss of the low-pass filter portion at frequency $f$ equals $$10 \log \left[1+\left(\frac{f}{f_0}\right)^4\right]$$

decibels.

The low-pass portion of the filter shown in Fig. 9 is made up of series inductance coils 100 and 101, having inductance values $L_4$ and $L_2$, respectively, and shunt condensers 102 and 103, having capacitance values $C_3$ and $C_1$, respectively, a resistive load 104 having a resistance value of $R_0$ being connected across condenser 103. The high-pass filter portion comprises series condensers 105 and 106, having capacitance values $C_4$ and $C_2$, respectively, and shunt inductance coils 107 and 108, having inductance values $L_3$ and $L_1$, respectively, a load resistance 109 of value $R_0$ being connected across inductance element 108. The values of the inductive elements in henries and of the capacitive elements in microfarads may be found from the following formulae in which $\omega_0=2\pi f_0$ and $$L_2=\frac{1.083R_0}{\omega_0}; \quad C_2=\frac{1}{\omega_0^2 L_2}$$

$$L_4=\frac{1.531R_0}{\omega_0}; \quad C_4=\frac{1}{\omega_0^2 L_4}$$

$$C_1=\frac{0.3827}{\omega_0 R_0}; \quad L_1=\frac{1}{\omega_0^2 C_1}$$

$$C_3=\frac{1.577}{\omega_0 R_0}; \quad L_3=\frac{1}{\omega_0^2 C_3}$$

The loss of the low-pass filter portion at frequency $f$ equals $$10 \log \left[1+\left(\frac{f}{f_0}\right)^8\right]$$

decibels.

The constant resistance filter of Fig. 10 comprises a low-pass portion terminated in a resistive load 114 and a high-pass portion terminated in a resistive load 119. The low-pass portion comprises series inductance elements 110 and 111 having inductance values $L_3$ and $L_1$, respectively, and a shunt path made up of an inductive element 112 having an inductance $L_2$ and a condenser 113 having a capacitance $C_2$ in series, the shunt path connecting a common terminal of inductance elements 110 and 111 and a terminal of load 114 as shown. The high-pass filter portion comprises series condensers 115 and 116 having capacitance values $C_3$ and $C_1$, respectively, and a shunt path made up of inductance element 117 having an inductance $L_4$ and condenser 118 having a capacitance $C_4$ in series, the shunt path connecting a common terminal of condensers 115 and 116 and a terminal of load 119 as shown.

The values of the inductance elements in henries and of the capacitive elements in microfarads is given by the following formulae in which $f_1$=frequency of infinite loss of low-pass filter portion;
$\omega_1=2\pi f_1$
$f_1'$=frequency of infinite loss of high-pass filter portion;

$$f_1 f_1' = f_0^2; \quad K=\frac{f_0}{f_1}; \quad \omega_0=2\pi f_0$$

$$L_1=\frac{(1-K^2)R_0}{2\omega_0}; \quad C_1=\frac{1}{\omega_0^2 L_1}$$

$$L_3=\frac{(3-K^2)R_0}{2\omega_0}; \quad C_3=\frac{1}{\omega_1^2 L_3}$$

$$C_2=\frac{4(1-K^2)}{(3-K^2)\omega_0 R_0}; \quad L_2=\frac{1}{\omega_1^2 C_2}$$

$$L_4=\frac{1}{\omega_0^2 C_2}; \quad C_4=\frac{1}{\omega_0^2 L_2}$$

The loss of the low-pass filter portion is $$10 \log \left[1+\left[\frac{X(K^2-X^2)}{(1-K^2 X^2)}\right]^2\right]$$

where $$X=\frac{f}{f_0}$$

Suppose, for example, that it is desired to design a constant resistance filter for a bridge-type rectifier for supplying 0.10 ampere to a load at 200 volts across the load. Suppose further, that the frequency of the alternating-current source is 60 cycles per second and that the ripple current produces not over 0.02 root-mean-square volt across the load. The impedance looking into the filter from the rectifier will be a resistance equal to 200 divided by 0.10 or 2000 ohms. Assuming no direct-current drop in the filter, the ripple voltage to be suppressed will be 0.48 times 200 which equals 96 root-mean-square volts at a frequency of 120 cycles per second. To reduce the ripple component from 96 volts to 0.02 volt will require a low-pass filter attenuation of 73.6 decibels. If a filter structure of the type shown in Fig. 9 is used, the cross-over frequency $f_0$ will be 14.44 cycles per second and the filter elements will have the following values:

$L_2$=23.88 henries  $C_2$=5.03 microfarads
$L_4$=33.80 henries  $C_4$=3.558 microfarads
$C_1$=2.11 microfarads  $L_1$=57.60 henries
$C_3$=8.69 microfarads  $L_3$=14.00 henries The power packs used in the coaxial cable transmission system of Fig. 1 may be of the type shown in Fig. 11, for example. The power pack comprises input transformers 120 and 121 having primary windings 48 and 49, respectively, to which alternating current is supplied in series from the source 35 through transformer 54. Transformer 120 has secondary windings 122, 123 and 124 and transformer 121 has secondary windings 125, 126 and 127. Windings 123 and 126 in parallel supply alternating current to a load 128 and windings 124 and 127 in parallel supply alternating current to a load 129. The loads 128 and 129 may comprise filamentary cathodes or cathode heaters of space current devices, for example. Windings 122 and 125 in series supply alternating current to the input terminals of a bridge-type, full-wave rectifier 163. The output terminals of rectifier 163 are connected to the input terminals of a constant resistance filter 160 comprising a high-pass filter portion and a low-pass filter portion in parallel. The low-pass filter portion comprises a series inductance coil 130 of 4.13 henries and a shunt condenser 131 of 6.8 microfarads. The high-pass filter portion comprises a series condenser 132 of 6.8 microfarads and a shunt inductance element 133 of 4.13 henries. This relatively simple and inexpensive constant resistance filter can be used in a power rectifier system since it is necessary to provide only enough attenuation in the low-pass portion to make the impedance facing the rectifier substantially a constant resistance. The amount of attenuation required in the low-pass filter to reduce the effect of the output termination of the filter on the input to about one per cent is 20 decibels. Means are provided for further attenuating the ripple component to a desired degree. For this purpose the output of the low-pass portion of filter 160 is connected to the input of an "M" derived filter comprising two shunt condensers 134 and 135 each of 4.2 microfarads and a series path which comprises an inductance element 136 of 2.52 henries and in parallel therewith a condenser 137 of 0.73 microfarad.

The alternating-current component from the high-pass portion of filter 160 is supplied through a transformer 161 to a second full-wave rectifier 162. The output of the rectifier 162 is connected to the input of a second constant resistance filter 138 of a simple type. The low-pass portion of filter 138 comprises a series inductance element 139 of 6.0 henries and a shunt capacitance 140 of 1.14 microfarads. The high-pass filter portion of filter 138 comprises a series condenser 141 of 1.14 microfarads and a shunt inductance coil 142 of 6.0 henries. In some cases the high-pass portion of filter 138 may be further simplified by omitting the coil 142, it being unnecessary for satisfactory operation. The ripple current output of rectifier 162 is further suppressed by connecting the output of the low-pass portion of filter 138 to a second "M" derived filter comprising shunt condensers 143 and 144 each of 0.7 microfarad and a series path comprising an inductance element 145 of 3.75 henries and in parallel therewith a condenser 146 of 0.116 microfarad. If desired, of course, a single condenser may be used in place of the parallel-connected condensers 140 and 143, this also being the case with respect to condensers 131 and 134. The alternating components from the output of the high-pass portion of filter 138 are supplied through a transformer 147 to a third rectifier 148. The output of rectifier 148 is connected to the input of a low-pass filter comprising a series inductance coil 149 of 30 henries and a shunt condenser 150 of 4.2 microfarads.

The rectifiers 163, 162 and 148 supply direct currents to three loads 151, 152 and 153. The load 151 having a resistance of about 710 ohms is supplied with a direct current of 0.282 ampere from rectifier 163. The voltage across load 151 is therefore about 200 volts. The direct voltage from rectifier 162 is added to the direct voltage from rectifier 163 to impress a direct voltage of about 330 volts across the load 152 of about 4020 ohms, the current through load 152 being about 0.082 ampere. The rectifier 163 thus supplies a direct current of $0.282+0.082=0.364$ ampere at 200 volts and the low-pass filter for rectifier 163 works into a resistance $R_0$ equal to $$\frac{200}{.364}$$

or 550 ohms. This resistance value determines the impedance level of the filter for rectifier 163 and therefore the values of the inductance and capacitance elements which are used. The rectifier 162 supplies a direct current of 0.082 ampere at 130 volts across filter condenser 144 and therefore the low-pass filter for rectifier 162 works into a resistance $R_0'$ equal to $$\frac{130}{0.082}$$

or 1585 ohms. The load resistance of the filter for rectifier 162 being known, the filter constants may be determined. Rectifier 148 supplies a direct current of 0.008 ampere to the load 153 at a load voltage of 160 volts. The resistance $R_0''$ looking into the load is therefore $$\frac{160}{.008} = 20,000$$

ohms. The impedances looking into the primary transformer windings 48 and 49 are each a substantially pure resistance of 32.6 ohms.

What is claimed is:

1. In combination, current rectifying means having an input connected to an alternating-current supply source, a low-pass filter connected to the output of said rectifying means for transmitting the direct component of the rectified current to a load and for suppressing alternating components of the rectified current, and means for reducing harmonic distortion of the current supplied from said alternating-current supply source to said rectifying means, said means comprising a current path having resistance and reactance connected to said output of said rectifying means in parallel with said low-pass filter for reducing the reactive component of the impedance looking into said input of said rectifying means.

2. Current rectifying apparatus comprising a first rectifier having input and output terminals, means for coupling said input terminals to an alternating-current supply source, a first low-pass filter connected to the output terminals of said rectifier for transmitting the relatively steady direct component and for suppressing alternating components of current supplied thereto from said rectifier, the cut-off frequency of said low-pass filter being less than the lowest frequency alternating component of the current supplied thereto from said rectifier, a high-pass filter connected to the output terminals of said rectifier for transmitting alternating components and for suppressing the relatively steady direct component of current supplied thereto, a second rectifier having input and output terminals, means for coupling the input terminals of said second rectifier to the output terminals of said high-pass filter, a second low-pass filter connected to the output terminals of said second rectifier for transmitting the direct component and for suppressing alternating components of current supplied thereto, and means for supplying direct current transmitted by each of said low-pass filters to a load.

3. In combination, a rectifier having an input circuit and an output circuit, means for supplying alternating current to said input circuit, impedance means having substantially unity power factor connected to said output circuit, said impedance means comprising means for deriving from the rectified current in said output circuit and supplying to a load a substantially steady direct-current component.

4. In combination, a rectifier having input and output terminals, means for impressing an alternating voltage across said input terminals for causing a pulsating rectified voltage to be set up across said output terminals, and filtering means connected to said output terminals and presenting to said rectifier an impedance having a power factor of the order of one, thereby reducing the reactive component of the input impedance of said rectifier and minimizing harmonic distortion of the alternating current supplied to said rectifier, said filtering means comprising means for deriving a substantially steady unidirectional component from the pulsating output current of said rectifier.

5. In combination, a rectifier for rectifying alternating current supplied thereto, means for supplying the rectified current to a load circuit the input impedance of which presented to said rectifier has a power factor of the order of unity, whereby harmonic distortion of the alternating current supplied to said rectifier is minimized, said load circuit comprising low-pass filter means for suppressing alternating components of the rectified current and for transmitting the relatively steady direct component to a load.

6. In combination, a rectifier for rectifying alternating current supplied thereto, means for supplying the rectified current to a load circuit the input impedance of which presented to said rectifier has a power factor of the order of one, whereby the reactive component of the input impedance of said rectifier is reduced, said load circuit comprising a low-pass filter for suppressing alternating components of the rectified current and for transmitting the relatively steady direct component to a first load and a high-pass filter for transmitting said alternating components suppressed by said low-pass filter to a second load.

7. In combination, a first rectifier for rectifying alternating current supplied thereto, means for supplying the rectified current to a first load circuit the impedance of which presented to said first rectifier has a power factor of the order of one, whereby harmonic distortion of the alternating current supplied to said rectifier is minimized, said load circuit comprising a first low-pass filter for suppressing alternating components of the rectified current and for transmitting the relatively steady direct-current component to a load and a first high-pass filter for transmitting said alternating-current components suppressed by said first low-pass filter, a second rectifier for rectifying said alternating-current components transmitted thereto by said first high-pass filter, means for supplying the rectified current from said second rectifier to a second load circuit the impedance of which presented to said second rectifier has a power factor of the order of one, said second load circuit comprising a second low-pass filter for suppressing alternating components of the rectified current from said second rectifier and for transmitting the relatively steady direct-current component to a load and a second high-pass filter for transmitting to a load said alternating-current components suppressed by said second low-pass filter.

8. In combination, a rectifier for rectifying alternating current supplied thereto, a constant resistance filter having a low-pass filter portion for suppressing alternating components and for transmitting the relatively steady direct component of the rectified current to a load and having a high-pass filter portion for suppressing said direct component and for transmitting said alternating components to a load, and means for connecting the input of said low-pass filter portion and the input of said high-pass filter portion in parallel to the output of said rectifier.

9. In combination, a constant resistance filter comprising a low-pass filter portion and a high-pass filter portion each having a pair of input terminals and a pair of output terminals, a rectifier for rectifying current from an alternating-current source to set up a pulsating unidirectional voltage, and means for impressing said pulsating voltage upon the input terminals of said low-pass and high-pass filter portions in parallel to cause a relatively steady direct component of the rectified current to be supplied through said low-pass filter portion to a load and to cause the alternating components of the rectified current to be supplied through said high-pass filter portion to a load, said low-pass filter portion having an attenuation equal to that of said high-pass filter portion at a cross-over frequency which is less than the frequency of the current from said alternating-current source.

10. In combination, a constant resistance filter comprising a low-pass filter portion and a high-pass filter portion each having an input and an output, a rectifier for rectifying current supplied from an alternating-current source to the rectifier input, means for connecting the output of said rectifier to the input of said low-pass filter portion and to the input of said high-pass filter portion in parallel, said low-pass filter portion having an attenuation equal to that of said high-pass filter portion at a cross-over frequency which is less than the frequency of the current from said alternating-current source, a low-pass filter having its input connected to the output of said low-pass filter portion for supplementing said low-pass filter portion in attenuating alternating components of the output current of said rectifier, means for supplying the relatively steady direct component of the current from said rectifier passed by said low-pass filter portion and by said low-pass filter to a load, and means for supplying the alternating-current components of the rectified current passed by said high-pass filter portion to a load.

11. In combination, a plurality of power packs each comprising an input transformer having a primary and a secondary and a rectifier connected to said secondary, a transmission line having appreciable resistance for transmitting alternating current from a supply source to said transformer primaries in series, said power packs being located at widely spaced positions along said transmission line, means associated with each of said rectifiers for deriving a substantially steady direct-current component from the rectifier output, said means comprising a constant resistance filter, whereby the reactive component of the input impedance of each power pack is reduced and whereby harmonic distortion of the alternating current supplied over said transmission line to said primaries is minimized.

12. In combination, a transmission line having distributed series resistance and shunt capacitance for transmitting alternating current from a supply source to a plurality of rectifiers located at spaced points along said transmission line, means for inductively loading said line to compensate for said shunt capacitance, input transformers for said rectifiers having primary windings connected in series with each other through said transmission line, and constant resistance filters for terminating said rectifiers respectively.

13. A combination in accordance with claim 12 in which each of said constant resistance filters comprises a low-pass portion for suppressing alternating-current components of the rectifier output current and for transmitting a substantially steady direct component to a load and a high-pass portion for suppressing the steady direct component and for transmitting the alternating components to a load.

14. In combination in accordance with claim 13 in which there are provided a plurality of auxiliary rectifiers for rectifying the alternating components of the currents transmitted by the high-pass portions of the constant resistance filters, respectively.

15. In combination, current rectifying means connected to an alternating-current supply source, a low-pass filter connected to said rectifying means for transmitting the direct component of the rectified current to a load and for suppressing alternating components of the rectified current, and a current path having resistance and reactance connected to said rectifying means in parallel with said low-pass filter for reducing the reactive component of the input impedance of said rectifying means.

ERWIN W. HOLMAN.

REFERENCES CITED

The following references are of record in the file of this patent:

UNITED STATES PATENTS

| Number | Name | Date |
|---|---|---|
| 1,718,515 | Alexanderson | June 25, 1929 |
| 2,008,519 | Smith | July 16, 1935 |
| 2,236,254 | Willis | Mar. 25, 1941 |